May 1, 1934.  J. POLLARD  1,957,151
AIR JACK.
Filed May 8, 1933  2 Sheets-Sheet 2
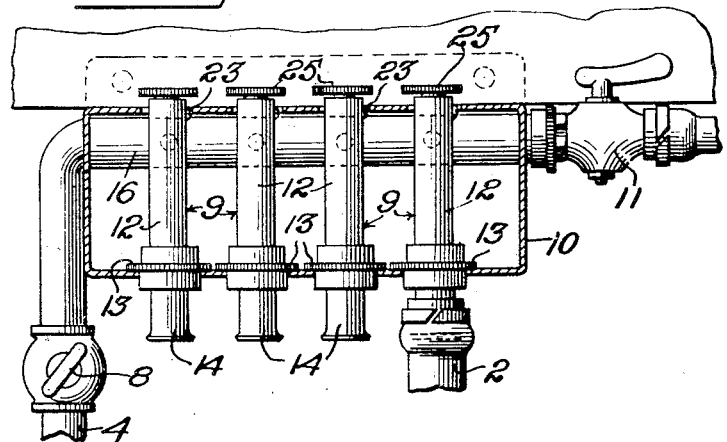
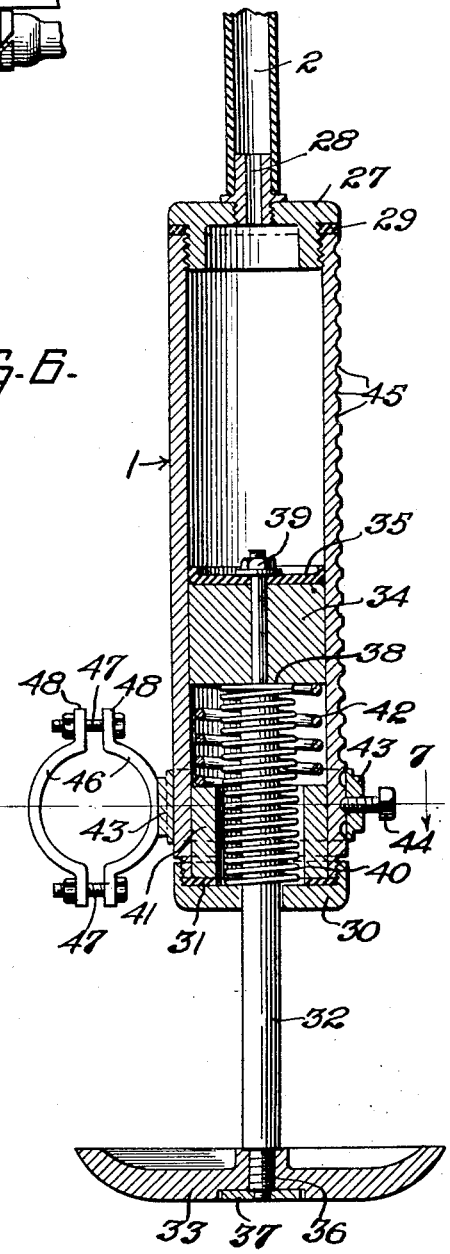
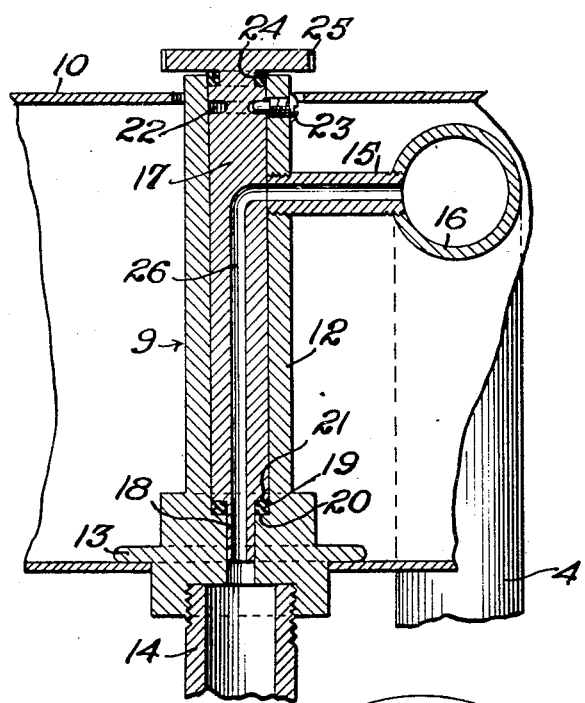
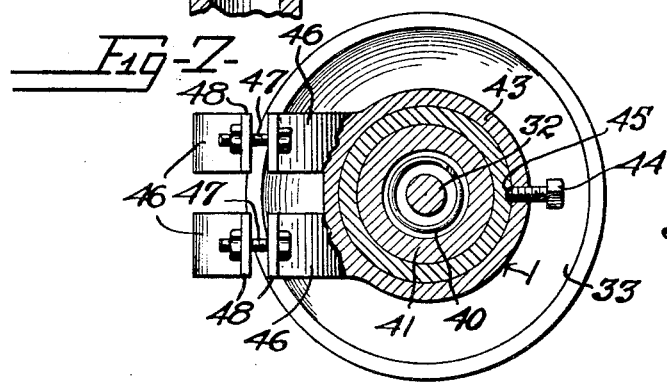
Jessie Pollard
INVENTOR
BY Victor J. Evans & Co.
ATTORNEY Patented May 1, 1934

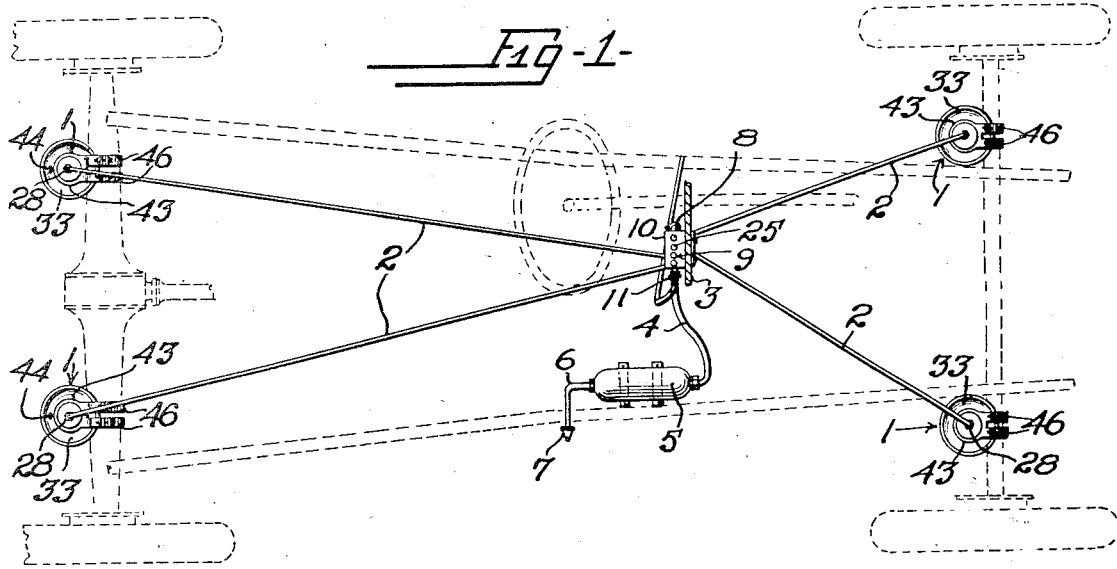

1,957,151

UNITED STATES PATENT OFFICE 1,957,151

AIR JACK

Jessie Pollard, Monroe, La., assignor of one-half to S. C. Lamothe, Monroe, La.

Application May 8, 1933, Serial No. 669,976

1 Claim. (Cl. 254—86)

This invention relates to means for lifting the wheel of an automobile from the ground to facilitate the changing of tires, demonstrating the free mounting of the wheel and for other purposes. Heretofore, the wheel of an automobile could be lifted from the ground only by the use of a manually operated jack which involved delay as well as hard work and was disagreeable.

The present invention provides a mechanism which is mounted upon the vehicle and operated by fluid pressure to lift any desired wheel from the ground as occasion may demand.

The invention is illustrated in the accompanying drawings and will be hereinafter fully set forth and particularly defined.

In the drawings:

Figure 1 is a diagrammatic view showing an embodiment of the invention in top plan.

Figure 2 is a diagrammatic view showing the invention in side elevation.

Figure 3 is an enlarged top plan view, partly broken away and in section, of apparatus embodying the invention.

Figure 4 is an enlarged detail showing means for distributing the air pressure so that it will operate at the desired wheel.

Figure 5 is an enlarged vertical section through one of the distributing valves.

Figure 6 is an enlarged vertical section through one of the jacks.

Figure 7 is a section on the line 7—7 of Figure 6.

As shown in Figures 1, 2 and 3, the invention provides a plurality of jacks 1 each of which is provided with means whereby it may be secured to an axle of the vehicle adjacent the wheel which is to be raised or lowered by the operation of the jack. A pipeline 2 extends from each jack to a controlling mechanism mounted upon the dash 3 of the vehicle and this controlling mechanism is connected by a hose or pipe 4 with a tank 5 securely fastened in any desired manner upon the chassis of the vehicle and equipped with a feeding nozzle 6 within which is a check valve 7 whereby air under pressure may be supplied to the tank at a service station whenever deemed necessary. The check valve will permit the flow of air into the tank or reservoir but will, of course, prevent its outflow therefrom so that the supply will be maintained within the reservoir as long as it is not drawn upon to operate one or more jacks. It will be understood, of course, that, if preferred, an air pump may be mounted upon the vehicle and connected with the vehicle motor so that the supply of fluid pressure will be automatically maintained. The pipe 4 which conveys the compressed air or other pressure fluid from the tank to the controlling mechanism is, of course, equipped with a valve 8 of any approved form whereby the flow of air to the controlling and distributing elements may be cut off and loss of the fluid through leakage will be prevented.

The controlling mechanism includes a plurality of distributing valves, indicated in general by the numeral 9, and each connected through one of the pipe lines 2 with one of the jacks. The several distributing or controlling valves are preferably housed within a chest 10 mounted upon the dash of the vehicle and this chest is provided with an outlet valve 11 which is normally closed but may be opened when it is desired to relieve the pressure upon any jack and permit the lifted wheel to descend. The valve 11 may be an ordinary cut-off valve or may be of any approved design. Each distributing valve 9 comprises an outer cylinder 12 provided with a flange 13 at its lower end which rests upon the bottom of the chest 10, the extremity of the cylinder extending through the bottom of the chest, as shown clearly in Figure 5, and being formed with an internally threaded socket receiving the end of a nozzle 14 to which the respective pipe 2 is attached. The upper end of the cylinder 12 preferably projects slightly through the top of the chest 10 and in one side of the cylinder is a threaded opening receiving one end of a coupling tube 15, the opposite end of which is threaded into a manifold 16 which is connected with the inlet pipe 4 and extends across the chest as will be understood upon reference to Figure 4. A key or rotatable plug 17 is fitted closely within the cylinder 12 and has at its lower end an extension or nipple 18 which extends into the central bore of the lower end of the cylinder 12, as shown clearly in Figure 5, and a gasket 19 is fitted around this nipple between the internal shoulder 20 in the cylinder and the external shoulder 21 on the key or plug. The upper end of the plug 17 is provided with an annular groove 22 and a set screw 23 is mounted in the side of the cylinder 12 and formed with a smooth end 24 which fits within the annular groove 22 whereby the key is permitted to rotate but is held against axial movement. The upper end of the key is provided with a milled head 25 which is disposed above the chest 10 whereby it may be easily manipulated by the chauffeur. The head of each key bears a suitable inscription indicating which jack will be actuated by manipulation of the key or valve.

The key or plug 17 is formed with an axial bore or passage 26 which leads through the lower end of the key and near the upper end of the key is turned laterally so that when the key is in the proper position the passage 26 will communicate with the bore of the coupling 15 and permit fluid pressure to flow to the jack to be operated. When the upper laterally turned end of the passage 26 is out of alinement with the coupling 15 the flow of air will, of course, be cut off and the connected jack will not be operated, it being understood that when the cut-off valve 8 is opened and the valve 11 is closed, fluid pressure will flow from the tank 5 into the manifold 16 and thence through such coupling as may be in alinement with the passage 26. After a jack has been operated to raise a wheel, the valves 8 and 11 are both maintained in closed position so as to hold the pressure on the jack and when the use of the jack is over the valve 11 is opened so that the pressure will re relieved and the pressure fluid may escape to the open air.

Each jack comprises a cylinder having its upper end closed by a head 27 equipped with a nozzle or nipple 28 upon which the delivery end of the pipeline 2 is connected, as shown clearly in Figure 6, a suitable gasket or packing 29 being fitted between the end of the cylinder and the head 27 so as to prevent leakage. The head 30 closes the lower end of the cylinder and a suitable washer or packing 31 is fitted in the joint to prevent leakage. The head 30 is provided with a central opening through which passes a piston rod 32 having a shoe 33 secured upon its lower end and having a piston 34 secured upon its upper end and fitting closely but slidably within the cylinder, a washer or packing 35 being provided at the upper side of the piston to prevent leakage as will be understood. The shoe 33 is preferably removable and may be secured in place in any desired manner, the drawing showing a threaded stem 36 on the end of the piston rod receiving a nut 37 which fits within a recess provided therefor in the lower side of the shoe. The piston rod is provided ar its upper extremity with an annular shoulder, indicated at 38, which bears against the lower side of the piston 34 and a nut 39 on the upper end of the piston rod bears against the washer 35 so that the washer and the piston are clamped against the shoulder 38. A buffer spring 40 is provided about the piston rod between the piston head and the lower end of the cylinder so as to resist damage to the parts in the event that the piston head should be driven downwardly at too high a speed, and this buffer spring is held suitably centered relative to the cylinder and the piston rod by a ring 41 disposed concentrically about the piston and within the cylinder as shown in Figure 6. A heavier spring 42 is coiled about the piston rod between the ring 41 and the piston head 34 and this spring is put under compression when the piston is lowered so that when the pressure upon the piston is relieved the spring will at once expand and coöperate with the weight of the vehicle to cause descent of the vehicle and relative upward movement of the piston. When the elevated wheel of the vehicle again reaches the ground the piston head and the shoe 33 will, of course, be raised so as to clear the ground and permit travel of the vehicle.

Encircling the cylinder is a collar 43 carrying a set screw 44 the end of which is adapted to engage any one of a series of sockets 45 provided in the side of the cylinder and extending longitudinally from end to end thereof. At a point opposite the clamping screw 44 the collar 43 carries a clamp comprising mating bands 46 adapted to pass around an axle of the vehicle and secured thereto by bolts 47 inserted through corresponding lugs 48 on the bands.

From the foregoing description, taken in connection with the accompanying drawings, it is thought the operation and advantages of the apparatus will be readily understood. Normally the pressure fluid is confined within the tank 5 and the jacks will all be raised. If it should be desired to raise one of the vehicle wheels for any purpose, the valve 8 is opened and the controlling valve 9 connected with the selected jack is set so that the passage 26 will register with the coupling 15 and pressure therefrom flow to the selected jack. The fluid pressure acting upon the upper side of the piston head 34 will cause the piston head to move downwardly and force the shoe 33 onto the ground whereupon the continued pressure will react against the upper head of the cylinder and will lift the adjacent vehicle wheel so as to permit manipulation thereof. When the wheel has been raised the valve 8 is, of course, closed so as to cut off further flow of the fluid pressure and prevent waste of the fluid. When the tire has been changed, inspection completed, or other work finished, the outlet valve 11 is opened whereupon the weight of the vehicle will cause the same to descend as will be understood, the expansion of the return spring 42 completing the return of the jack to its normal position by lifting the shoe 33 as has been stated.

The apparatus is very simple in construction and may be readily mounted upon any vehicle at a low cost. It is easily manipulated and permits the chauffeur to raise any desired wheel or corner of the vehicle without leaving his seat or being under necessity of performing any heavy manual labor.

The provision of the plurality of sockets 45 in the side of the jack cylinder permits the cylinder to be set at various heights and thereby permit the jack to be adjusted to variations in the build of different vehicles.

Having thus described the invention, I claim:

An apparatus for the purpose set forth including a fluid pressure jack comprising a cylinder, means for admitting fluid pressure to the cylinder, a piston rod passing through the lower end of the cylinder, a shoe secured upon the lower end of the piston rod, a piston secured upon the upper end of the piston rod within the cylinder, a buffer between the lower end of the cylinder and the piston, a centering member disposed about said buffer, and a return spring disposed between the centering member and the piston.

JESSIE POLLARD.